United States Patent [19]

Biber et al.

[11] 4,188,103
[45] Feb. 12, 1980

[54] RANGE SYNCHRONIZED FLASH PHOTOGRAPHIC APPARATUS AND METHOD FOR ACHIEVING OPTIMUM FLASH EXPOSURE

[75] Inventors: Conrad H. Biber, Needham; Bruce K. Johnson, Andover; George D. Whiteside, Lexington, all of Mass.

[73] Assignee: Polaroid Corporation, Cambridge, Mass.

[21] Appl. No.: 898,546

[22] Filed: Apr. 21, 1978

[51] Int. Cl.² .................. G03B 7/10; G03B 15/05
[52] U.S. Cl. .................................... 354/27; 354/29; 354/30; 354/33; 354/34; 354/60 F; 354/137; 354/139
[58] Field of Search .............. 354/27, 29, 30, 33, 354/34, 60 F, 137, 139, 149

[56] References Cited

U.S. PATENT DOCUMENTS

| 3,478,660 | 11/1969 | Land ................... 354/139 |
| 3,570,381 | 3/1971 | Sateo et al. ............. 354/49 |
| 3,762,299 | 10/1973 | Douglas ................ 354/235 |
| 3,794,422 | 2/1974 | Chitayat ................. 355/67 |
| 3,972,058 | 7/1976 | Johnson et al. .......... 354/149 |
| 4,020,497 | 4/1977 | Ueda ..................... 354/27 |
| 4,047,190 | 9/1977 | Johnson et al. ........... 354/27 |
| 4,047,191 | 9/1977 | Coppa et al. ............. 354/27 |

Primary Examiner—Michael L. Gellner
Attorney, Agent, or Firm—David R. Thornton

[57] ABSTRACT

An image recording apparatus and method employing a diaphragm shutter having a time variable exposure aperture with flash firing, following actuation of the shutter, after a time interval dependent on subject range. The functional relationship between the time interval and subject range establishes a parametric relationship between the brightness of the subject due to its flash illumination and the scan time of the diaphragm shutter. The inverse of this parametric relationship constitutes the timewise variation in the exposure aperture area of the shutter. Consequently, whenever the subject is within a predetermined maximum distance from the camera, dependent upon the maximum aperture area attainable by the shutter, the instantaneous product of subject brightness and aperture area will be a constant with the result that proper exposure of the photographic film is achieved independent of the subject range.

24 Claims, 7 Drawing Figures

RANGE SYNCHRONIZED FLASH PHOTOGRAPHIC APPARATUS AND METHOD FOR ACHIEVING OPTIMUM FLASH EXPOSURE

BACKGROUND OF THE INVENTION

This invention relates to a method of and apparatus for recording an image as by photography of a subject under flash illumination with optimum exposure independent of the range of the subject.

In the photographic art, exposure systems employing a diaphragm or scanning shutter having an exposure aperture area that varies with time during the exposure interval are known. Representative patents showing scanning shutters are U.S. Pat. No. 3,762,299; U.S. Pat. No. 3,972,058 and U.S. Pat. No. 4,047,190. In the above patents, a scanning shutter is described which includes a pair of counter reciprocal blades each having a primary aperture that traverses the optical axis of the camera during the exposure interval. These primary apertures are shaped so that upon overlying one another during counter movement of the blades, the exposure aperture value, defined in part by one primary aperture and in part by the other primary aperture, increases from zero to a maximum value in a preselected period of time.

In these arrangements, exposure control is exerted by a summing or integrator circuit whose resistance is constituted by a photocell located behind a photocell aperture formed by secondary apertures in the blades. Like the exposure aperture value, the photocell aperture value is also designed to change with time, such change being synchronized with the change in the exposure aperture value so as to provide proper exposure control over a wide range of conditions. The photocell aperture value which controls the scene light emitted to the photocell opens coincident with or in slightly leading arrangement to passage of first light through the exposure aperture, and when the integrator reaches a given level, a trigger circuit is fired a reverse the scan movements of the blades, which are rapidly returned to their initial position blocking passage of scene light to the photosensitive recording medium, i.e., the film.

As indicated in the above-noted patents, the diaphragm shutter system and its exposure control arrangements are designed for operation of the cameras in either an ambient or flash mode of operation, and the shape of the primary and secondary blade apertures are important to obtaining proper exposure in both modes. In these arrangements, for the flash mode of operation, the scanning blades are stopped at an aperture value preselected in accordance with the position of the camera lens and hence, are responsive to subject range. Consequently, while the aperture values are varied prior to flash firing, a preselected fixed aperture is actually provided during the flash pulse.

Scanning shutters which utilize varying apertures during the flash pulse are also known as shown by U.S. Pat. No. 3,570,381 and U.S. Pat. No. 4,020,497. In these patents, a flash fire switch is adjusted in accordance with lens focusing so that the flash will coincide with a range of aperture values; this range of aperture values being selected automatically in accordance with lens focusing and hence subject range. While these dynamic flash systems will in many instances provide satisfactory flash exposure, it should be recognized that they are dependent upon a variable switch arrangement which is subject to mechanical position errors. Additionally, in U.S. Pat. No. 4,047,191, an incandescent flash is ignited coincident with or just prior to opening of a scanning shutter with the flash illumination envelope superimposed in a leading arrangement on the aperture opening curve so as to provide increasing illumination intensity in slightly leading relation to the increasing aperture values.

One attempt to further improve flash exposure is suggested in U.S. Pat. No. 3,794,422 wherein the transmissivity of an electro-optical shutter is varied as a function of the speed of light so as to provide uniform exposure of all subjects within the flash range. In this arrangement, the flash is fired as the transmissivity of the shutter is varied from a blocking condition such that the transmissivity will be relatively low when the flash is fired but rapidly increases to a maximum. If a subject is relatively close to the camera, it will appear to be relatively brightly illuminated, however, the light reflected from that close subject will be received by the shutter when its transmissivity is relatively low. Under such condition, the shutter will relatively strongly attenuate this reflected light such that only a predetermined amount will pass. However, where the subject is relatively distant, the same amount of light will pass even though the subject will appear considerably less bright, because by the time the light is reflected from the distant subject the shutter transmissivity will have increased to a level functionally related to this dimmer light. Although the just-described arrangement is at least theoretically possible, it can be seen that the requirements for such a electro-optical shutter presents severe complications as to size, weight and expense both in terms of the shutter itself as well as the modulator required to produce the required change in transmissivity. Additionally, since the shutter functions in the order of the speed of light, the precision required for the flash device and its firing time are also unduly burdensome.

It is, therefore, an object of the present invention to provide a new and improved method of and apparatus for photographing a subject under flash illumination to achieve an optimum exposure with such transient illumination.

Another object is to provide a method of and apparatus for achieving optimum exposure under combined transient and steady state illumination.

SUMMARY OF THE INVENTION

Briefly, in the inventive arrangement, flash illumination of a subject to be photographed, using a scanning shutter having a time-variable exposure aperture area, is accomplished by driving the shutter at a selected scan rate and producing a flash or pulse of illumination at the end of a time interval, measured from actuation of the shutter (i.e., time of first light), dependent on both the range of the subject and the shutter scan rate. The functional relationship between the time interval and subject range establishes a parametric relationship between the brightness of the subject due to its flash illumination and the scan time of the shutter. The inverse of this parametric relationship constitutes the timewise variation in the exposure aperture area of the shutter. For a given flash output, whenever the subject is within a predetermined maximum distance from the camera (dependent on the maximum aperture area attainable by the shutter) the instantaneous product of subject brightness and aperture area will be a constant, resulting in proper exposure of the film independently of subject range. In the preferred embodiments, the timed interval is determined by a rangefinder employing sonic detection.

Briefly, the method includes the steps of determining a timed interval proportionally related to subject range, exposing a recording medium through increasing aperture values whose rate of increasing area is correlated to the interval-range proportion, and providing a pulse of illumination, following initiation of said exposing step, after a period related to said timed interval so that said illumination pulse is synchronized with an aperture value, or small range of aperture values, selected in accordance with subject range to provide proper exposure for the subject range.

Where ambient (steady state) illumination is negligible, the timed interval and the flash firing time (following first light through the shutter) will be equal; however, ambient light can be accounted for in the present invention by triggering the flash after a period dependent on both the ambient light and subject range.

In one of the illustrated embodiments, a sonic rangefinder is utilized for initiating an integrator circuit after an interval of time, subsequent to transmission of a sonic burst, to provide a flash fire time linearly proportional to the range of the subject returning the echo. The integrator includes a resistor in parallel with a photocell exposed to light from the scene, and a trigger circuit responsive to the output of the integrator for firing the flash and closing the shutter when the output reaches a predetermined trigger level. Preferably, the shutter opening (i.e., first light) is delayed, after transmission of the sonic burst, by a predetermined period of time which is the same time as the integrator would require for its output to reach the trigger level when the ambient light on the photocell is negligible. As a consequence, under very low ambient light level, essentially only the resistor is effective in the integrator and the flash is triggered and shutter closed a fixed time subsequent to detection of an echo; the fixed time being equal to the delay time in opening the shutter. When ambient light is present, it contributes to the integrator summing to reduce the flash fire time in accordance with the ambient level and the scan rate such that the firing of the flash and closing of the shutter occurs sooner, i.e., at a smaller aperture, than would be the case were the integrator time-out determined solely by the resistor. Consequently, the flash is fired before the exposure aperture area has reached its optimum size with respect to the range of the subject thereby reducing the amount of light transmitted by the shutter from the subject due to its flash illumination; this reduction in flash illumination being balanced by the ambient light present such that a proper exposure is obtained.

BRIEF DESCRIPTION OF THE DRAWINGS

Embodiments of the present invention are disclosed in the accompanying drawings wherein.

DETAILED DESCRIPTION

The present invention is based on utilizing a scanning shutter whose program, i.e., time-wise variation in exposure aperture area, is selected such that if A is the instantaneous area of the aperture when the flash or, that is, transient illumination occurs, and if B is the brightness of the subject due to its illumination by the flash, then $A \times B$ is a constant which in independent of range. This implies that the amount of transient scene light incident on the photographic film operatively associated with the shutter will always be the same. With a given film speed and light output of the flash, proper exposure of the film will be assured independently of subject range up to a maximum range determined by the maximum size of the exposure aperture area and the flash output, assuming ambient scene light is negligible.

Prior to describing the illustrated embodiments in detail, it should be noted that the term "flash" is intended to include any transient light pulse and while the invention is preferably practiced with an electronic flash or strobe whose pulse duration is quite short as compared to the shutter scan time, it is also applicable to longer duration light pulses, such as from incandescent flash units.

Figure 1:
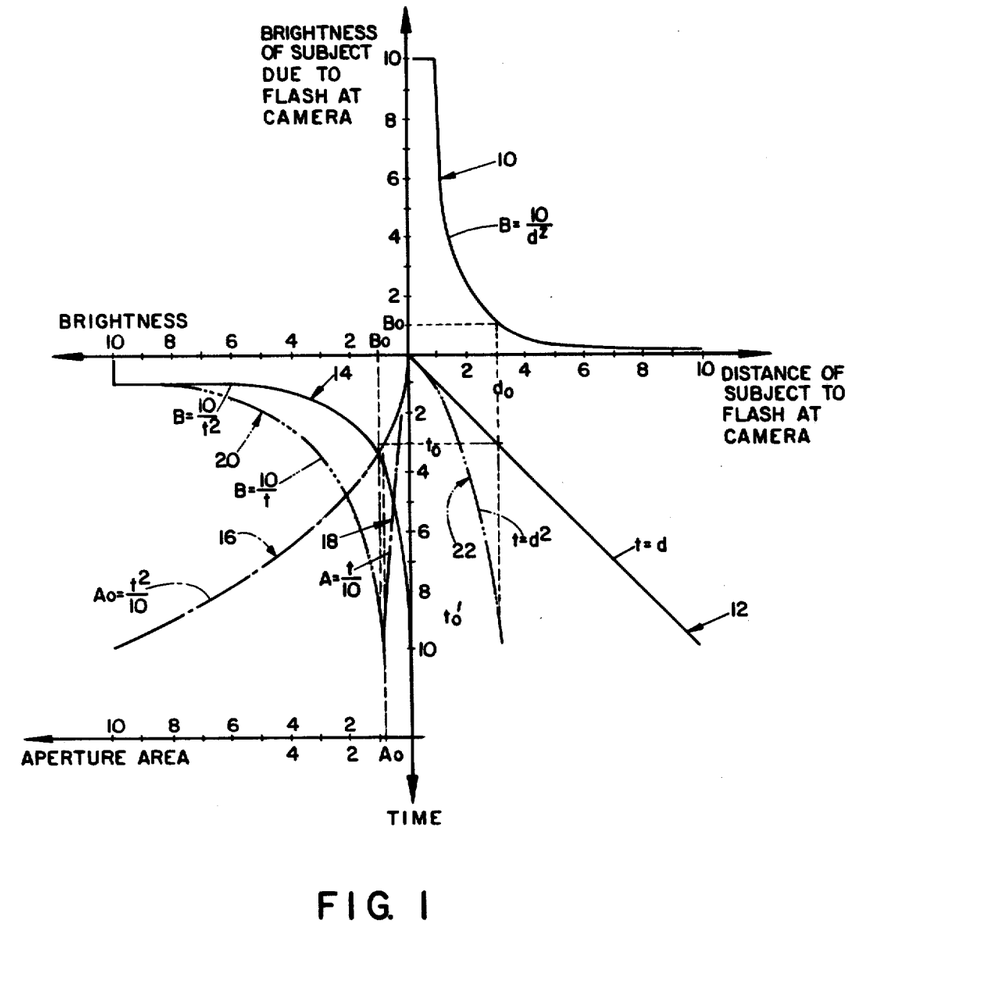
FIG. 1 is a composite plot showing the variation in brightness of a subject due to flash illumination as a function of distance of the subject to a camera, and the variation in exposure aperture area as a function of time resulting from the parametric relationship between subject brightness and time arising from the functional relationship between subject distance and time.

The manner in which a program for a scanning shutter can be selected is illustrated in FIG. 1, wherein the scales have been chosen to fit the curves onto the space available and are of no significance to the present invention. Reference numeral 10 is a curve that shows the variation in brightness of a subject, due to its illumination by a flash of given output, as a function of subject range from the flash source, or from the camera where the flash is relatively close thereto. Curve 10 demonstrates the inverse square relationship between subject brightness and range, i.e., $B \triangleq f(1/d^2)$. If time intervals are considered as representative of subject range, i.e., $t \triangleq f(d)$, then both the brightness of the subject and the time intervals are functions of the parameter "distance." Consequently, the brightness of the subject due to its illumination by flash is a parametric function of time.

If the time interval representing subject range is a linear function of distance as indicated by curve 12, then curve 14 represents the parametric relationship of subject brightness with time. Obviously, curve 14 does not infer that the brightness of a subject illuminated by flash changes with time, but merely shows that if the range of a subject is $d_0$, whereby its brightness is $B_0$, then if the flash is fired at time $t_0$ corresponding to the distance $d_0$, the brightness of the subject will be $B_0$ as indicated in FIG. 1. Since the relationship between range and time is assumed linear as indicated by curve 12, the direct relationship between time and the brightness of the subject due to the flash illumination will vary as the inverse square of this time as shown by curve 14.

In accordance with the invention, it follows that for the present embodiment, curve 16, which represents the timewise variation in exposure aperture area of the scanning shutter, is inversely related to curve 14. That is, curve 16 varies with the square of time for embodiments where the range related time parameter is linear with range.

Conventional techniques are available for designing the shapes of exposure apertures in superposed flat blades that constitute a diaphragm or scanning shutter in order for the shutter aperture area or aperture values to have a time-squared program. However, according to the present invention, the exposure aperture area of the scanning shutter can have programs other than the one shown by curve 16 and, in fact, can be linear or have an arbitrary time variation dependent only on the nature of the range-time function. For example, it may be desirable to have a linear scan program rather than a time-squared scan program either for mechanical or design reasons, or in order to retrofit an existing scanning shutter camera with the present invention. Curve 18 represents such a linear program for the scanning shutter; and it requires the brightness curve 20 to have a 1/t form in order for the product of area and brightness to remain constant. The nature of curves 10 and 20 are such that the range-time variation must satisfy the relationship $t \triangleq f(d^2)$ as indicated by curve 22.

The desired relationship between range and time can be established by utilizing a member having a physical property whose value is representative of the range of a subject. For example, for a linear range factor the member can be a resistor in an integrator because the vale of the resistance in a simple integrator is linearly related to the time required for the integrator output to reach a predetermined value. A linear potentiometer whose setting is responsive to the setting of an optical range-finder is a practical way to establish time as a function of range. As another example, the round trip time for a sonic burst to travel between a transmitter and subject is linearly related to the range of the subject. Similarly, for different scanning programs, a non-linear relationship between range and time can be established by suitable modifications of the systems described above.

While the below-described embodiments are illustrative of moveable lens cameras which first employ subject ranging to position the lens, this is quite separate from range firing of the flash and the latter may be employed with a fixed lens or, that is, fixed focus cameras.

Figure 2:
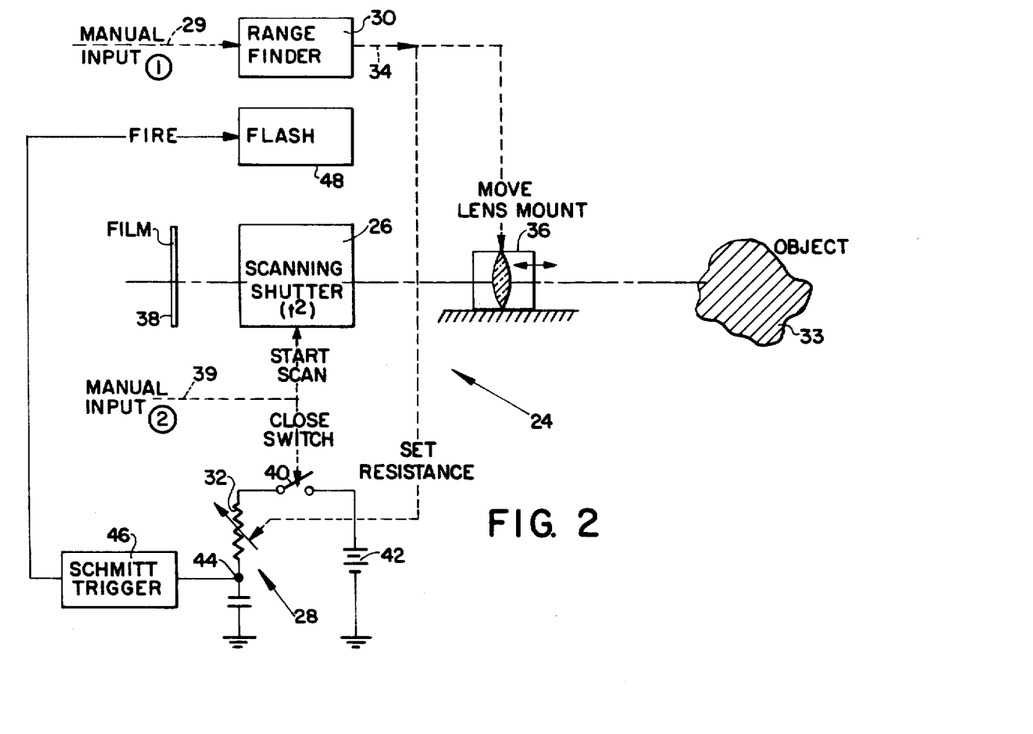
FIG. 2 is a block diagram showing a first embodiment of the invention ideally suited for taking photographs under flash illumination when ambient scene light is negligible.
Figure 3:
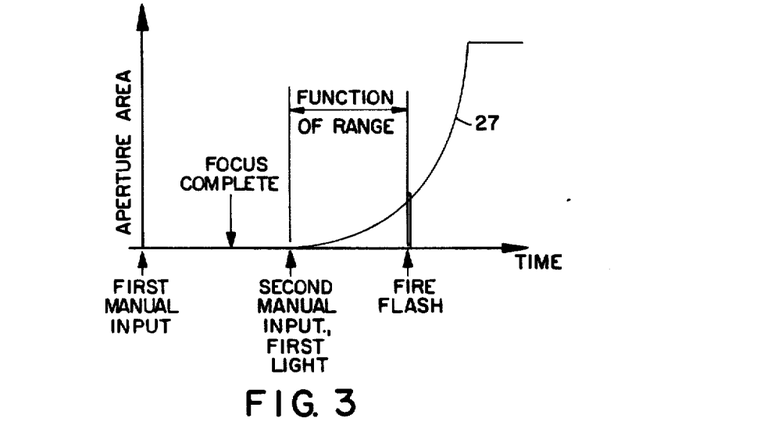
FIG. 3 is a time diagram showing the variation of the exposure aperture area of the scanning shutter shown in FIG. 2.

Referring now to FIG. 2, reference numeral 24 designates a camera incorporating a first embodiment of the invention utilizing a scanning shutter 26 having a $t^2$ program as indicated by curve 27 in FIG. 3, and a linear range-time relationship by reason of an integrator 28. A first manual input 29 to a range finder 30 is utilized for the purpose of adjusting a linear potentiometer 32 of the integrator to a value directly proportional to the range of an object 33 from the camera 24. Rangefinder 30 can be a conventional optical rangefinder wherein the user views the object and mechanically moves an arm 34 until the object is in proper focus. In such case, the setting of the potentiometer 32 would be responsive to the movement of arm 34. In addition, the arm 34 may move a lens mount or lens assembly 36 until the lens assembly is in a position at which light from the object 33 will be focused on a photosensitive sheet of film 38 after the shutter 26 is activated by a second manual input 39 which also closes a switch 40 thereby coupling a power source such as a battery 42 to the integrator 28.

As shown in FIG. 3, the second manual input 39 occurs subsequent to completion of the focus; and it is assumed that first-light through the scanning shutter is substantially coincident with the initiation of the integrator 28. The voltage at node 44, which constitutes the output of the integrator, changes exponentially with time and reaches a trigger level which is sensed by a Schmitt trigger 46 after a period of time directly proportional to the range of object 34 from the camera. The trigger 46 responds, when the voltage at node 44 reaches the predetermined trigger level, by sending a firing signal to a flash unit 48 which is preferably, but not necessarily, an electronic flash whose duration is very much shorter than the duration of the scanning time as shown in FIG. 3. Consequently, in this embodiment, the firing of the flash 48 occurs, following first light, after an interval of time which is directly proportional to the range of the object.

For the reasons indicated above in connection with the discussion of FIG. 1, the area of the exposure aperture of the shutter 26 will have a functional relationship to the transient brightness of the object with the result that the amount of light passing through the scanning shutter and incident on the film 38 will provide proper exposure, assuming that ambient light is negligible and that the object 34 is within the maximum range of the system as determined by the maximum exposure aperture area. Assuming substantially all of the light incident on the film 38 is derived from the flash 48 (i.e., the ambient light is negligible), the shutter may be closed at any time following completion of the flash pulse.

The timing of the flash in accordance with subject range during shutter scanning synchronizes the flash with a narrow range of apertures in accordance with subject distance, and for an electronic flash, effectively synchronizes the short pulse of illumination with essentially a fixed aperture; that is in the latter case, any change in aperture during the extremely short flash pulse can often be considered to have minimal effect on the expected exposure.

Rangefinders other than optical rangefinders can be utilized in connection with the apparatus shown in FIG. 2 and, preferably, rangefinder 30 is in the form of a sonic rangefinder of the type disclosed in copending application Ser. No. 840,802, filed Nov. 11, 1977. In such case, the time required for a sonic burst to pass from a transducer (not shown) to the object and back to the transducer is a function of the range of the object. Consequently, the receipt of an echo can be utilized for the firing of flash 48 and the integrator 28 may be essentially eliminated. That is, for a fixed focus camera, the shutter actuation (first light) and the transmit pulse are synchronized, the shutter scans at a time squared program, and the echo triggers the Schmitt trigger to fire the strobe pulse at the appropriate aperture value.

The above description of FIG. 2 is based on the assumption that ambient light is negligible such that it provides an insignificant contribution to the exposure of the film 38. In order to account for ambient light, the arrangement shown in FIG. 4 can be utilized wherein camera 24' utilizes a sonic rangefinder in conjunction with a delayed opening of the shutter so that flash fire time predicted by the sonic range time may be reduced to account for ambient light.

Figure 4:
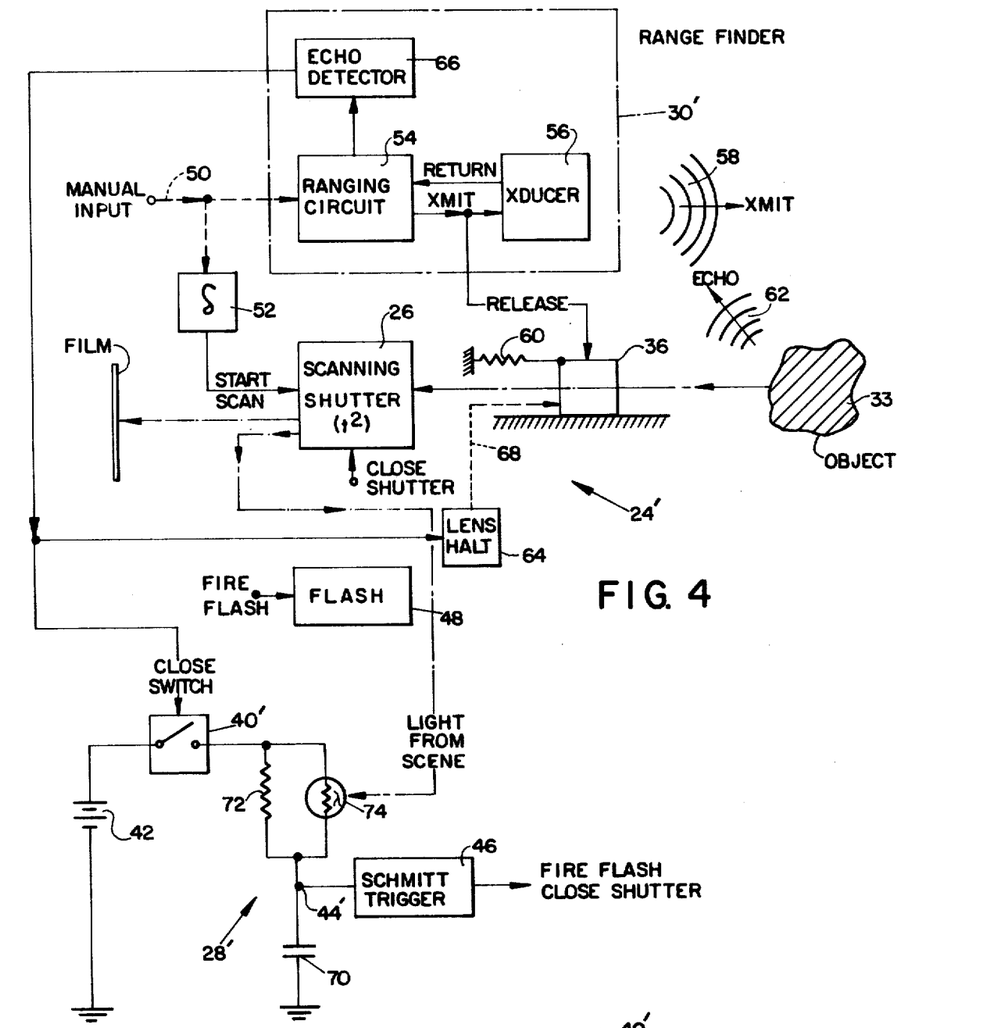
FIG. 4 is a block diagram of the preferred embodiment of the invention for photographing an object illuminated by both flash and ambient light.

Rangefinder 30' shown in FIG. 4 is a schematic illustration of the rangefinder disclosed in the above-noted application Ser. No. 840,802 wherein it is employed for focusing a movable lens arrangement. While such lens focusing arrangement may be utilized in the present embodiment, it is not necessary to the description of the present invention, and hence, details thereto are omitted for clarity. A manual input indicated at 50 will automatically focus the lens assembly 36 consistent with the range of the object 34 as indicated and also actuate the scanning shutter 26 after a predetermined time delay δ provided by a delay circuit schematically indicated by block 52. The manual input 50 to rangefinder 30' causes a ranging circuit 54 to issue a transmit command to sonic transducer 56 causing a burst of sonic energy 58 to be emitted from the transducer substantially coincident with manual input 50. An echo detector 66 which detects echo 62 after processing by the ranging circuit, closes a switch arrangement 40' associated with an integrator 28'. When the switch 40' closes, the voltage at the output node 44, of integrator 28', begins to increase exponentially in accordance with the value of capacitor 70 and the effective value of the resistance of the integrator which comprises the parallel combination of a fixed resistor 72 and a photodiode 74 located behind the photocell apertures of the scanning shutter and exposed to light from the scene being photographed when first light passes the exposure apertures of the shutter. When the voltage at node 44 reaches the trigger level, Schmitt trigger 46 fires flash 48 and terminates the scanning operation of the shutter by closing the same.

Figure 5:
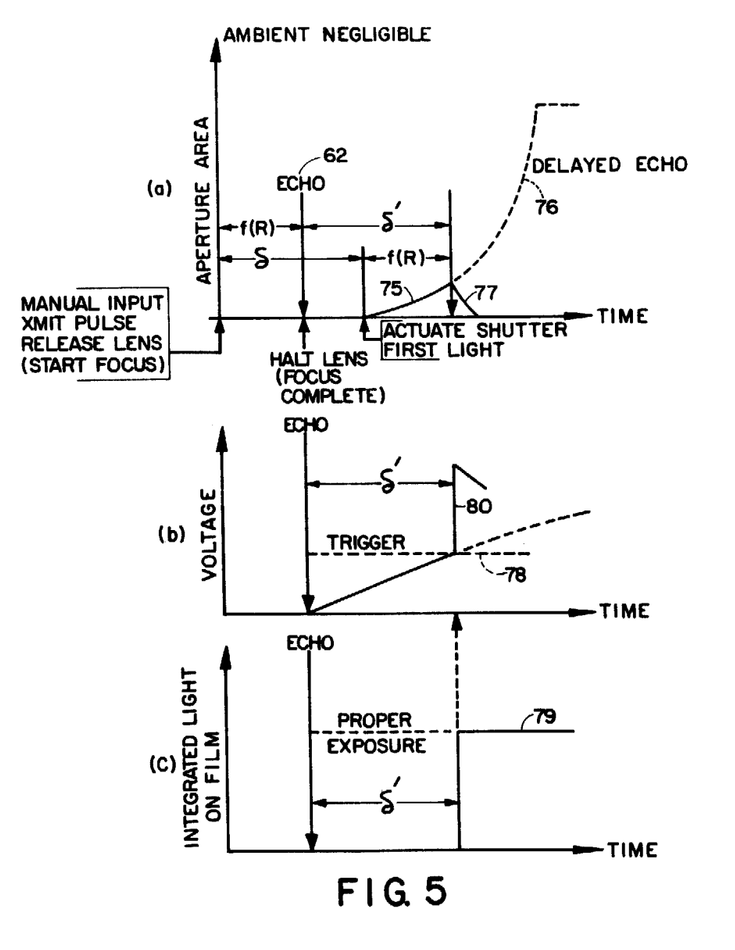
FIG. 5 is a series of plots showing the time relationship between actuation of the shutter and the firing of the flash when ambient scene light is negligible.
Figure 6:
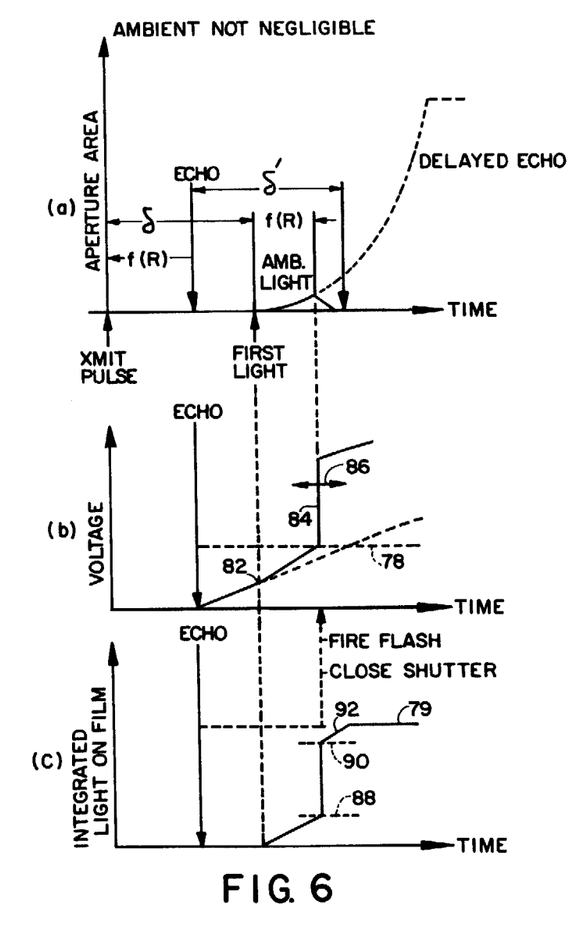
FIG. 6 is a plot similar to FIG. 5 but showing the situation when ambient light is present in the photographic scene under exposure.

The manner in which the apparatus shown in FIG. 4 will achieve proper exposure over a wide range of ambient lighting conditions is set forth in FIGS. 5 and 6. To simplify the explanation, the flash is presumed to be an electronic flash which conventionally provides a pulse of relatively short duration. FIG. 5 relates to the condition in which ambient light is negligible as described above in connection with FIGS. 2 and 3. In FIG. 5(a), the possible variation in aperture area of the scanning shutter as a function of time is shown by curve 76. In camera 24', as described with regard to FIG. 4, the shutter is actuated so that first light occurs after a time interval δ following manual input 50. Recalling that this time interval is equal to or longer than the time required for an echo to return from an object located at the maximum flash range of the camera, FIG. 5(a) shows that receipt of echo 62 occurs within the interval δ, and follows the manual input by a period of time functionally related to the range of the object. Thus, switch 40' (FIG. 4) is closed prior to first light through the scanning shutter with the result that battery 42 is applied to integrator 28' coincident with receipt of echo 62. However, since the ambient light is negligible, the resistance of photodiode 74 will be high and the effective resistance of the integrator circuit is essentially the resistance of the resistor 72 which is selected such that the trigger level at node 44 is reached after a time interval δ'. Consequently, the "delayed echo" or the output of the Schmitt trigger 46 occurs after a period of time δ' following echo 62 as shown in FIG. 5(a). Consequently, the flash 48 is fired and the close command applied to the shutter 26 in response to triggering of the trigger 46 which is subsequent to first light through the shutter by a period of time equal to the period of time between receipt of the echo 62 and the instant of manual input 50. That is, in this instance, the flash fire time as measured from camera actuation is equal to the sum of the range related time plus the shutter delay δ. The solid portion 75 of curve 76 represents the change in area from first light to receipt of the closing command; while curve 77 represents the change in area as the shutter responds to the closing command.

Referring now to FIG. 5(b), the voltage at node 44 is shown as increasing from zero at the instant of receipt of echo 62 towards the battery voltage and reaching the trigger level 78 after a period of time δ' equal to the delay time δ described above. Upon reaching the trigger level 78, the Schmitt trigger 46 fires flash 48 and closes the shutter. At that time, photodiode 74 responds to the impulse-like light output of flash 48 by a sudden decrease in resistance to a level related to subject range producing the step-like increase 80 in the voltage at node 44; however, since the Schmitt trigger has already been tripped, the latter is of no consequence.

The amount of light incident on the film 38 operatively associated with the scanning shutter 26 is shown in FIG. 5(c). During the time interval δ', no light is incident on the film since it has been assumed that the ambient light is negligible. When the Schmitt trigger 46 detects the trigger level at node 44 and fires the flash, the light incident on the film will increase to level 79 dependent upon the product of the brightness of the object due to its illumination by the flash pulse and the area of the shutter at substantially the instant the flash is fired, assuming, of course, that the flash fire and flash pulse are substantially simultaneous and that the light pulse is very short, as normally produced by electronic strobes. By proper selection of the parameters of film speed, light output of the flash, and the design of the scanning shutter, a proper exposure of the film can be obtained independently of subject range. Note that the finite closing time of the shutter does not affect the amount of light incident on the film because substantially all of the light came from the very short duration flash.

In the event that the ambient scene light is not negligible, the photodiode 74 will contribute to the film exposure and shorten the time at which the flash is fired in accordance with the level of ambient light. As shown in FIG. 6(a), detection of echo 62 by the detector 66 causes the integrator 28' to be initiated prior to first light and the voltage at node 44 (FIG. 4) initially begins to change exponentially toward the battery voltage 42 in the same manner as shown in FIG. 5(b). At a time δ following manual input 50 when first light occurs with respect to the film operatively positioned behind shutter 26, first light also occurs with respect to photodiode 74. The ambient light reduces the resistance of the photodiode, and hence, the time constant of integrator 28', in accordance with the amount of ambient light resulting in the break, shown at 82 in FIG. 6(b), in the summing rate of the output of the integrator. Consequently, the output begins to increase more rapidly toward the battery voltage and reaches trigger level 78 in a time shorter than δ', depending on the level of ambient light. Hence, the time period selected for the flash firing in accordance with subject distance is reduced in accordance with the ambient light. Double-ended arrow 86 indicates the time-wise positions of step 84 which are dependent on both subject range and the ambient level.

When the flash is fired (by the trigger 46) the resistance of the photodiode 74 is significantly reduced as in the previous case where ambient light is negligible, and a step-like increase 84 occurs in the voltage at the output node 44' of the integrator. In this arrangement, since the close command or termination signal is applied to the shutter by the trigger at the same time as the flash is fired, the contribution of the ambient light to the exposure is essentially that occuring prior to the flash.

The amount of light incident on the film 38 as a consequence of ambient light and the flash illumination of the subject is shown in FIG. 6(c). During the time interval between receipt of the echo and first light, no light from the scene being photographed is incident on the film. Between first light and until the flash is fired, ambient light enters the exposure aperture, with this amount increasing with the increase in the exposure aperture value. Prior to firing the flash, the integrated light will be at a level 88 depending, of course, on the intensity of the ambient scene light. Then, when the trigger 46 detects the predetermined voltage level at node 44, it fires the flash such that the light incident on the film increases rapidly. However, since the area of the exposure aperture at the instant the flash is fired is smaller than it would have been if firing of the flash occurred at time δ (as in FIG. 6c) the flash contribution to the exposure has been reduced to account for ambient light. Consequently, the exposure, due to both the flash and to the ambient light prior to the flash, reaches the level 90 and because of the finite closing time of the shutter, ambient light continues to contribute slightly to film exposure after the short flash pulse as indicated by segment 92 in FIG. 6(c). By the time the shutter is completely closed, the exposure light will have reached level 79, which as previously indicated, is sufficient to properly expose the film.

For clarity of the description, the shutter actuation delay δ and the flash fire delay δ' were considered equal; however, this assumes that shutter actuation and first light are simultaneous, hence in practice the flash fire delay will be slightly greater than the shutter actuation delay by an amount equal to the difference between shutter actuation and first light.

Figure 7:
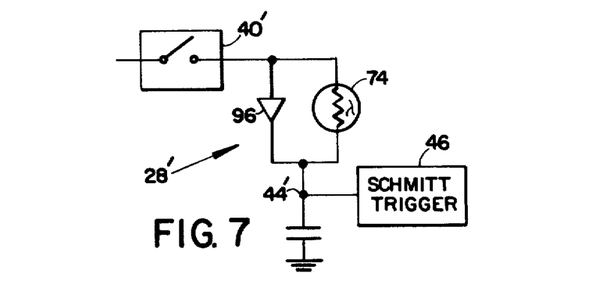
FIG. 7 illustrates an alternate embodiment of the system of FIG. 4 and depicts an arrangement for providing a flash fire interval as a non-linear function of subject range.

In FIG. 7, the flash fire circuit of FIG. 4 is modified to provide a flash fire interval which is a non-linear function of the subject range for use with a shutter scan rate having other than a time squared program. In this figure, the resistor 72 is replaced by a diode 96 which provides a flash fire time interval as a logarithmic function of the subject range for use with a linear shutter scan rate.

Additionally, the flash fire time interval may be varied to suit different scan rates by adding a plurality of diodes (not shown) with appropriate series resistors to produce any desired functional relationship between the subject distance and the flash fire time interval. Consequently, the embodiment of FIG. 4 illustrates a system having means (e.g., sonic) for defining a time interval functionally related (e.g., linearly) to subject distance and means (switch 44' and diode 96) for converting the above time interval to a flash fire interval non-linearly related to subject distance to accommodate a selected shutter scanning function.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. Apparatus for photographing a subject, comprising:
    a scanning shutter which when actuated produces a predetermined, timewise variation in exposure aperture area;
    ranging means for providing an output representative of the range of a subject;
    a flash unit; and
    means for actuating the shutter to start its scanning, the improvement comprising:
        means for firing the flash unit to produce a flash of illumination after a time period, measured from the first light through the shutter, dependent on the output of the ranging means, the relationship between the time period and subject range establishing a parametric relationship between the brightness of the subject due to its flash illumination and the scanning time of the shutter, the inverse of this parametric relationship constituting the timewise variation in the exposure aperture area of the shutter.

2. Apparatus according to claim 1 wherein said relationship between said time interval and range is linear, and the exposure aperture area varies as the square of the time during scanning.

3. Apparatus according to claim 1 wherein the ranging means includes an integrator whose output is representative of the range of the subject and which begins to integrate in response to actuation of the scanning shutter, and wherein the means for firing the flash unit includes a trigger circuit that fires the flash unit when the output of said integrator reaches a predetermined trigger level.

4. Apparatus according to claim 3 wherein said integrator has a resistor whose value is directly related to the range of the subject.

5. Apparatus according to claim 4 wherein the value of said resistor is set in accordance with the range of the subject.

6. Apparatus according to claim 3 wherein the range means includes a photodetector responsive to light from the subject for modifying the output of the integrator in accordance with ambient light.

7. Apparatus according to claim 1 including manually operable means, the means for actuating the shutter being responsive to operation of said manually operable means for actuating the shutter to produce first light therethrough after a first predetermined time delay, and wherein said ranging means includes an integrator circuit having an electrical element in parallel with a photodetector exposed to light from the subject, and a trigger circuit responsive to the output of the integrator for firing the flash and closing the shutter when the integrator output reaches a predetermined trigger level, said integrator circuit being energized, subsequent to operation of said manually operable means, after a period of time related to the range of the subject, and said electrical element of said integrator having a value such that the output of said integrator will reach said predetermined trigger level in a second time delay equal to said first time delay such that, when the ambient light on the photodetector is negligible, said flash is fired after a time equal to the sum of said first predetermined time delay and said range related time interval.

8. Apparatus according to claim 7 wherein the range means includes a sonic rangefinder which transmits a burst in response to operation of the manually operable means, and which processes an echo from the subject such that receipt of the echo initiates said integrator circuit.

9. A method for recording the image of a subject illuminated at least in part by actuation of a flash unit to produce a pulse of transient illumination and employing a scanning shutter arrangement actuatable to initiate an exposure interval during which said shutter arrangement at least initially provides progressively increasing aperture values through which scene light from said subject is transmitted to a photosensitive recording medium, said method comprising the steps of:
   determining the distance between said subject and said flash unit and defining a time interval related to said distance;
   driving said shutter arrangement at a scanning rate selected in accordance with said relationship between subject distance and time; and
   actuating said flash unit to produce said pulse of illumination following said actuation of said shutter after a time period related to said time interval so that said pulse is automatically synchronized with a narrow range of aperture values selected in accordance with subject distance.

10. The method of claim 9 including the steps of determining the ambient light in the scene and reducing said time period proportionately thereto so that said pulse of illumination is synchronized with a second narrow range of aperture values of smaller value than the first-mentioned range.

11. The method of claim 9 wherein said determining and defining step includes defining a range related time interval measured from a given starting time, driving said shutter such that first light thereof occurs after a time delay of a longer time as measured from said starting time than that anticipated for said range related interval, and actuating said flash unit after a time period as measured from said starting point not greater than the sum of said range related time interval and said time delay.

12. The method of claim 11 including determining the ambient light level in the scene and reducing said time period in accordance therewith to define a second time period, and actuating said flash unit after a third time period, as measured from said starting point, equal to the sum of said second time period and said time delay.

13. In a flash exposure control system for recording scene images of a subject to produce a proper exposure of a photosensitive recording medium independent of subject distance, said system having a scanning shutter arrangement actuatable for at least initially providing increasing aperture values during an exposure interval within which scene light is transmitted to the photosensitive recording medium, said shutter arrangement providing said increasing aperture values at a predetermined scanning rate such that following actuation of said shutter arrangement, progressively increasing aperture values are provided at progressively increasing time intervals following said actuation, means for producing a flash of illumination during said exposure interval to illuminate said subject with transient illumination, means for determining the distance of said subject from said flash producing means and for synchronizing the production of said flash with operation of said scanning shutter arrangement so that transient illumination reflected from said subject is transmitted through said shutter arrangement to said recording medium by a narrow range of aperture values selected in accordance with subject distance, the improvement wherein said distance determining and flash synchronizing means comprises means for defining a range related time interval corresponding to subject distance and for producing said flash of illumination responsive to a lapse of a time period measured from first light of said shutter arrangement and proportional to said range related time interval to thereby produce said flash over a narrow range of aperture values automatically selected in accordance with subject distance.

14. The improvement of claim 13 wherein said distance determining and flash synchronizing means includes a range finder which directly produces said range related time interval defined by the elapsed time between transmission of a burst of energy toward the subject and return of an echo of energy therefrom.

15. The improvement of claim 13 wherein said scanning rate is selected to provide aperture values increasing as the square with time, said range related time interval is linearly related to subject distance and said time period is directly proportional to said range related interval.

16. The improvement of claim 13 wherein said scanning rate is selected to provide aperture values increasing linearly with time and said time period is proportional to the square of the subject distance.

17. The improvement of claim 13 wherein said distance determining and flash synchronizing means includes a sonic ranging system for producing a range related time interval linearly related to subject distance.

18. The improvement of claim 13 wherein said distance determining and synchronizing means additionally includes means for evaluating the ambient light level in said scene and for reducing said time period in accordance with ambient scene light.

19. The improvement of claim 13 additionally including means for actuating said distance determining and synchronizing means and for then actuating said shutter to produce first light therethrough after a selected delay, and wherein said distance determining and synchronizing means includes means for actuating said flash producing means after an elapsed time, measured from said system actuation, comprised of the sum of said delay and said time period proportional to said range related interval.

20. The improvement of claim 19 wherein said distance determining and synchronizing means includes a delay circuit for producing a second time period substantially equal to said selected delay and for actuating said flash producing means at the end of said second period, and means for actuating said delay circuit at the end of said range related time interval whereby said flash fire time is substantially the sum of said selected delay and said range related time interval.

21. The improvement of claim 20 additionally including means for reducing said second time period in accordance with the level of ambient scene light.

22. The improvement of claim 20 wherein said distance determining and synchronizing means includes a voltage sensitive trigger circuit for actuating said flash producing means when said trigger circuit reaches a given voltage level, said trigger circuit including a voltage summing element fed by both said delay circuit and a light sensitive network such that the actuation of said flash producing means is a function of both said subject distance and said ambient scene light level.

23. The improvement of claim 22 wherein said distance determining and synchronizing means includes a trigger circuit for producing a flash fire signal to actuate said flash producing means, said trigger circuit including a voltage summing element fed by both a timing network and a light sensing network such that the voltage of said summing element is responsive to both networks, and said timing network provides a timing function related to said subject distance.

24. A method for recording the image of a subject illuminated at least in part by actuation of a flash unit to produce a pulse of transient illumination and employing a scanning shutter arrangement actuatable to initiate an exposure interval during which said shutter arrangement at least initially provides progressively increasing aperture values through which scene light from said subject is transmitted to a photosensitive recording medium, said method comprising the steps of:

transmitting a burst of energy toward said subject and receiving an echo therefrom so as to define a time interval related to subject distance;

driving said shutter arrangement at a scanning rate selected in accordance with the relationship between subject distance and time; and actuating said flash unit upon receipt of said echo to produce said pulse of illumination, following said actuation of said shutter, after a time period related to said time interval so that said pulse is automatically synchronized with a narrow range of aperture values selected in accordance with subject distance.

* * * * *